United States Patent [19]

Kan et al.

[11] Patent Number: 5,422,401
[45] Date of Patent: Jun. 6, 1995

[54] MODIFIED α-OLEFIN POLYMER HAVING TERTIARY CARBON IN SIDE CHAIN, AND STRETCHED FILM PRODUCED THEREOF

[75] Inventors: Kojiro Kan, Ohnomachi; Katsumi Noritomi, Iwakuni, both of Japan

[73] Assignee: Mitsui Petrochemical Industries, Ltd., Tokyo, Japan

[21] Appl. No.: 214,186

[22] Filed: Mar. 17, 1994

[30] Foreign Application Priority Data

Mar. 19, 1993 [JP] Japan .................. 5-060076

[51] Int. Cl.⁶ .......................... C08F 8/42
[52] U.S. Cl. .................. 525/274; 525/330.2; 525/367; 525/368; 525/369
[58] Field of Search .......................... 525/274

[56] References Cited

U.S. PATENT DOCUMENTS

| | | | |
|---|---|---|---|
| 3,862,265 | 1/1975 | Steinkamp et al. | 525/274 |
| 3,997,487 | 12/1976 | Rees et al. | |
| 4,222,914 | 9/1980 | Makowski et al. | |
| 4,713,409 | 12/1987 | Hayes et al. | 525/274 |

FOREIGN PATENT DOCUMENTS

| | | |
|---|---|---|
| 0054761 | 6/1982 | European Pat. Off. |
| 0258003 | 3/1988 | European Pat. Off. |
| 0370753 | 5/1990 | European Pat. Off. |
| 0529102 | 3/1993 | European Pat. Off. |
| 120608 | 7/1983 | Japan |
| 164349 | 9/1984 | Japan |
| 63-10606 | 1/1988 | Japan |
| 83111 | 4/1988 | Japan |

*Primary Examiner*—Bernard Lipman
*Attorney, Agent, or Firm*—Sherman and Shalloway

[57] ABSTRACT

A modified α-olefin polymer whose side chain has tertiary carbon, obtained by melt-reacting 100 parts by weight of (A) an α-olefin polymer whose side chain has tertiary carbon with (B) 0.05 to 10 parts by weight of metal methacrylate or metal acrylate of the formula (1), $$(CH_2=\overset{R}{\underset{|}{C}}COO^-)_n M^{m+} X_{m-n} \quad (1)$$

wherein R is a hydrogen atom or a methyl group, M is a metal cation, X is an anion, m is an integer of at least 2, and n is an integer of at least 2, with a proviso of $m \geq n$; and a stretched film thereof.

15 Claims, No Drawings

MODIFIED α-OLEFIN POLYMER HAVING TERTIARY CARBON IN SIDE CHAIN, AND STRETCHED FILM PRODUCED THEREOF

The present invention relates to a modified α-olefin polymer whose side chain has tertiary carbon, and a stretched film produced thereof. More specifically, It relates to a modified α-olefin polymer excellent in impact resistance, heat resistance and mechanical properties and suitable for use in the fields of a structural material and a film; and a stretched film produced thereof.

A 4-methyl-1-pentene polymer has a melting point of 220° to 240° C. and shows a high heat deflection temperature, and it has excellent transparency and release characteristics. It is hence widely used in the fields of MWO tableware, release films and release paper for synthetic leather. However, a 4-methyl-1-pentene polymer is not much used in structural materials due to its poor impact resistance and mechanical strength. Further, it shows low stretchability, and in particular, the biaxial stretching thereof is difficult. For improving a 4-methyl-1-pentene polymer in impact resistance, there has been proposed a blend of a 4-methyl-1-pentene polymer and a specific ethylene α-olefin copolymer (Japanese Laid-open Patent Publication No. 164,349/1984). Since, however, this blend contains the above ethylene-α-olefin copolymer having low heat resistance as a rubber component, the blend shows extremely low heat resistance as compared with a 4-methyl-1-pentene polymer and an article formed from the blend is also poor in mechanical properties such as flexural strength and flexural modulus.

It has been also proposed to modify polyolefins with acrylic acid, methacrylic acid or a derivative of these (Japanese Laid-open Patent Publications Nos. 10,606/1988 and 140,212/1990), and a radical initiator such as peroxide or the like is used in combination in these cases. However, an α-olefin polymer having at least 3 carbon atoms such as 4-methyl-1-pentene polymer undergoes a decomposition reaction due to radical generated from the radical initiator and shows a sharp decrease in molecular weight. For this reason, the so-obtained modified polyolefin has very low mechanical properties. On the other hand, in a crosslinked polyolefin such as polyethylene, the cross-linking proceeds to result in a similar decrease in mechanical properties of a modified product.

Further, it has been also proposed to modify polyolefins with acrylic acid, methacrylic acid or a derivative of these (Japanese Laid-open Patent Publications Nos. 120,608/1983 and 83,111/1988), while it has not yet been proposed to use metal methacrylate or metal acrylate (metal=metal cation having a valence of 2 or more). It has been therefore strongly desired to develop a 4-methyl-1-pentene polymer which retains its inherent heat resistance, has improved impact resistance and mechanical strength and shows excellent stretchability.

Under the circumstances, our studies have been made for improving an α-olefin polymer in impact resistance, mechanical strength and stretchability while retaining the heat resistance equivalent to that of 4-methyl-1-pentene polymer, and the present invention has been arrived at.

It is therefore an object of the present invention to provide a modified α-olefin polymer whose side chain has tertiary carbon like a 4-methyl-1-pentene polymer, which is excellent in impact resistance, heat resistance and mechanical strength and suitable for use in various structural materials, films and stretched films.

It is another object of the present invention to provide a stretched film from the above modified α-olefin polymer.

Other objects and advantages of the present invention will be apparent from the following description.

According to the present invention, the above objects and advantages of the present invention are achieved, first, by a modified α-olefin polymer whose side chain has tertiary carbon, obtained by melt-reacting 100 parts by weight of (A) an α-olefin polymer whose side chain has tertiary carbon with (B) 0.05 to 10 parts by weight of metal methacrylate or metal acrylate of the formula (1),

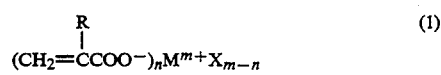
(1)

wherein R is a hydrogen atom or a methyl group, M is a metal cation, X is an anion, m is an integer of at least 2, and n is an integer of at least 2, with a proviso of $m \geq n$.

Examples of the α-olefin polymer whose side chain has tertiary carbon (A), used in the present invention, include a 4-methyl-1-pentene polymer, a 3-methyl-1-butene polymer, a 4-methyl-1-hexene polymer, a 5-methyl-1-hexene polymer and a 5-methyl-1-heptene polymer. The above 4-methyl-1-pentene polymer as the α-olefin polymer (A) includes a 4-methyl-1-pentene homopolymer and a copolymer of 4-methyl-1-pentene and an α-olefin having 2 to 20 carbon atoms such as ethylene, propylene, 1-butene, 1-hexene, 1-octene, 1-decene, 1-tetradecene or 1-octadecene. Of these copolymers, preferred is a copolymer which mainly contains at least 80% by weight of a 4-methyl-1-pentene component. Preferred as a comonomer is 1-decene, 1-dodecene, 1tetradecene, 1-hexadecene, 1-octadecene or 1-eicosene. These α-olefins may be used as a mixture in combination.

When the 4-methyl-1-pentene polymer as the α-olefin polymer (A) contains more than 20% by weight of a component from the above comonomer, undesirably, the heat resistance of the 4-methyl-1-pentene polymer extremely decreases. Therefore, the resultant modified α-olefin polymer is not much desirable for use as a construction material or a film if a cost performance is taken into consideration.

The above 4-methyl-1-pentene polymer as the α-olefin polymer (A) preferably has a melt flow rate (MFR) in the range of from 0.01 to 400 g/10 minutes when measured under a load of 5.0 kg at a temperature of 260° C. according to ASTM D1238. The above MFR is particularly preferably in the range of from 1 to 300 g/10 minutes.

When the 4-methyl-1-pentene polymer has an MFR of less than 0.01. it is difficult to obtain an excellent molded article even if the molding temperature is increased, since the flowability is too low. When it has an MFR of above 400, a molded article shows a decrease in impact resistance and mechanical strength, since the molecular weight is too low.

The metal methacrylate or metal acrylate (B) used in the present invention has the above formula (1). Examples of these include metal methacrylates such as zinc methacrylate, calcium methacrylate, magnesium methacrylate, barium methacrylate, aluminum methacrylate and tin methacrylate and metal acrylates such as zinc acrylate, calcium acrylate, magnesium acrylate, barium acrylate, aluminum acrylate and tin acrylate. Other metal methacrylate or acrylate containing a metal cation having a valence of at least 2 may be also used. Of these metal methacrylates or acrylates, preferred are zinc methacrylate, magnesium methacrylate, zinc acrylate and magnesium acrylate, since these have relatively highly compatible with the α-olefin polymer whose side chain has tertiary carbon such as a 4-methyl-1-pentene polymer. These metal methacrylates and acrylates may be used in combination.

Per 100 parts by weight of the α-olefin polymer whose side chain has tertiary carbon, the amount of the metal methacrylate or metal acrylate (metal=metal cation having a valence of at least 2) is preferably 0.05 to 10 parts by weight, more preferably 0.1 to 5.0 parts by weight, particularly preferably 0.2 to 3.0 parts by weight.

When the above amount of the metal methacrylate or metal acrylate is less than 0.05 part by weight, there is no sufficient effect on the improvement in impact resistance. When the above amount exceeds 10 parts by weight, MFR decreases, the α-olefin polymer is extremely difficult to mold, and a molded article is liable to be fragile.

In the modified α-olefin polymer of the present invention, which is produced by reacting 100 parts by weight of (A) the α-olefin polymer whose side chain has tertiary carbon and 0.05 to 10 parts by weight of (B) the metal methacrylate or metal acrylate while they are in a molten state, the MFR is preferably in the range of from 0.01 to 400 g/10 minutes, more preferably in the range of from 1.0 to 200 g/10 minutes when the above modified α-olefin polymer measured under a load of 5.0 kg at a temperature of 260° C. according to ASTM D1238.

When the modified α-olefin polymer has an MFR of less than 0.01, it is difficult to obtain an excellent molded article, since the flowability is too low. When the MFR is above 400, a molded article shows a decrease in mechanical strength, since the molecular weight of the polymer is too low.

The modified α-olefin polymer of the present invention is produced by reacting 100 parts by weight of (A) the α-olefin polymer whose side chain has tertiary carbon and 0.05 to 10 parts by weight of (B) the metal methacrylate or metal acrylate while they are in a molten state. The above production may be carried out by a known method in which the above (A) α-olefin polymer is mixed with the above (B) metal methacrylate or metal acrylate with a polystyrene V-blender, a ribbon blender, a Henschel mixer or a tumbler blender and then the mixture is melt-kneaded with a single-screw extruder, an extruder having a plurality of screws, a kneader or a Banbury mixer, and granulated or milled.

The temperature for the above production of the modified α-olefin polymer of the present invention is preferably higher than the temperature at which the metal methacrylate or metal acrylate is graft-polymerized to the α-olefin polymer (A) such as a 4-methyl-1-pentene polymer. That is, the temperature for the melt-kneading is preferably in the range of from 100° to 360° C., more preferably in the range of from 200° to 340° C.

The modified α-olefin polymer of the present invention may be used as a composition which additionally contains a variety of additives generally used with a polyolefin, such as a silane coupling agent, a weathering stabilizer, heat stabilizer, a slip agent, a nucleating agent, a pigment and a dye.

The modified α-olefin polymer of the present invention has excellent stretchability. According to the present invention, therefore, there is provided a stretched film formed of the α-olefin polymer of the present invention.

The stretched film of the present invention may be any one of a monoaxially stretched film and a biaxially stretched film.

The monoaxially stretched film can be obtained by melt-extruding the modified α-olefin polymer with an extruder to obtain an unstretched film and stretching the unstretched film 2.5 to 6 times, preferably 4 to 5 times at a temperature between 120° and 200° C., preferably between 140° and 180° C. The so-obtained stretched film may be heat-treated at a temperature between 150° and 220° C. as required.

The biaxially stretched film can be obtained by simultaneously or consecutively biaxially stretching the above unstretched film. Similarly to the above, the stretching temperature is between 120° and 200° C., preferably between 140° and 180° C. The unstretched film is biaxially stretched 2 to 10 times, preferably 4 to 8 times, as an area stretch ratio. The heat treatment for relaxation may be carried out at a temperature between 70° and 200° C. as required.

The unstretched film preferably has a thickness of 20 μm to 1 mm, and the stretched film preferably has a thickness of 2 to 100 μm.

The modified α-olefin polymer of the present invention has excellent impact resistance and mechanical strength while it retains heat resistance equivalent to that of the unmodified polymer such as a 4-methyl-1-pentene polymer, and it is also excellent in stretchability.

That is, the modified aα-olefin polymer of the present invention gives a molded article excellent in impact resistance, heat resistance and mechanical properties when molded by various molding methods such as an injection molding method and an extrusion molding method. The present invention gives a modified α-olefin polymer suitable for producing a variety of structural materials and films, and it also gives a stretched film obtained therefrom. A product obtained from the modified aα-olefin polymer of the present invention can be suitably used as a structural material for an automobile, a release film for a flexible printed circuit board, a release paper for artificial leather or a jacketing material for producing a rubber hose.

The modified α-olefin polymer of the present invention shows a specific behavior concerning melt viscosity, that is, the melt viscosity sharply decreases when the resin temperature exceeds 300° C. Therefore, it can be used as a viscosity adjuster in various ways.

The modified α-olefin polymer of the present invention will be explained hereinafter with reference to Examples. The invention, however, shall not be limited to these Examples.

The evaluations described in Examples were conducted by the following methods under the following conditions.

(1) Preparation of specimen

Specimens were injection-molded under the following conditions.

Molding conditions

Injection molding machine: M100, supplied by Meiki Seisakusho

Cylinder temperature (C1/C2/C3/nozzle): 270/290/300/300° C.
  Mold temperature: 60° C.
  (2) Preparation of biaxially stretched film
  (i) Preparation of raw sheet
  A raw sheet was prepared under the following conditions.
  Molding conditions
  Extruder: 65 mmφ, supplied by Modern K.K.
  Cylinder temperature: 280° C.
  Cooling roll temperature: 60° C.
  Sheet thickness: 370 μm
  (ii) Preparation of biaxially stretched film
  The raw sheet was stretched under the following conditions to prepare a biaxially stretched film.
  Stretching conditions
  Apparatus: Biaxially stretching apparatus, supplied by Toyo Seiki K.K.
  Preheating temperature: 160° C.
  Preheating time: 5 minutes
  Stretch ratio: 5 times×5 times
  Stretch rate: 4 m/minute
  Size of raw sheet for biaxial stretching: 95 mm×95 mm×370 μm
  (3) Evaluation of physical properties
  The physical properties were evaluated under the following conditions.
  (i) MFR
  Pellets were measured for MFR under a load of 5 kg at a temperature of 260° C. according to ASTM D1238.
  (ii) Izod impact strength
  Izod impact strength was measured according to ASTM D256.
  (iii) Tensile test
  Specimens of ASTM type IV were prepared, and measured according to ASTM D638.
  (iv) Flexural strength
  Flexural strength and modulus were measured according to ASTM D790.
  (v) Heat deformation temperature (HDT)
  HDT was measured according to JIS 7206, while the load was set at 66 psi.

EXAMPLE 1

100 Parts by weight of a 4-methyl-1-pentene. 1-hexadecene copolymer powder (1-hexadecene content: 4.0% by weight, MFR=0.5 g/10 minutes), 1.0 part by weight of zinc methacrylate (supplied by Asada Kagaku K.K.), 0.10 part by weight of 3,9-bis[2-{3-(3-tert-butyl-4-hydroxy-5methylphenyl)propionyloxy}-1,1,-dimethylethyl]2;4,8,10-tetraoxaspiro[5.5]undecane (trade name: Sumilizer GA80, supplied by Sumitomo Chemical Co., Ltd.) as a stabilizer, 0.10 part by weight of penta(erythrityl-tetra-β-mercaptolauryl)propionate (trade name: Seenox 412S, supplied by Shipro Kasei Kaisha) and 0.03 part by weight of calcium stearate (trade name: Calcium Stearate, supplied by Sankyo Yuki Gosei K.K.) were mixed at a high rate with a Henschel mixer for 1 minute. The resultant mixture was allowed to react by melt-kneading it with a twin-screw extruder at 310° C., and pellets were obtained. The pellets were measured for an MFR. The pellets were injection-molded to prepare specimens, and the specimens were measured for physical properties. Table 1 shows the results.

EXAMPLE 2

100 Parts by weight of a 4-methyl-1-pentene. 1-hexadecene copolymer powder (1-hexadecene content: 4.0% by weight, MFR=0.5 g/10 minutes), 1.0 part by weight of magnesium methacrylate (supplied by Asada Kagaku K.K.), 0.10 part by weight of 3,9-bis[2-{3-(3-tert-butyl-4-hydroxy-5-methylphenyl)propionyloxy}-1,1,-dimethylethyl]2,4,8,10-tetraoxaspiro[5.5]undecane (trade name: Sumilizer A80, supplied by Sumitomo Chemical Co., Ltd.) as a stabilizer, 0.10 part by weight of penta(erythrityl-tetra-β-mercaptolauryl)propionate (trade name: Seenox 412S, supplied by Shipro Kasei Kaisha) and 0.03 part by weight of calcium stearate (trade name: Calcium Stearate, supplied by Sankyo Yuki Gosei K.K.) were mixed at a high rate with a Henschel mixer for 1 minute. The resultant mixture was allowed to react by melt-kneading it with a twin-screw extruder at 310° C., and pellets were obtained. The pellets were measured for an MFR. The pellets were injection-molded to prepare specimens, and the specimens were measured for physical properties. Table 1 shows the results.

EXAMPLE 3

100 Parts by weight of a 4-methyl-1-pentene.1-hexadecene copolymer powder (1-hexadecene content: 4.0% by weight, MFR=0.5 g/10 minutes), 1.0 part by weight of calcium methacrylate (supplied by Asada Kagaku K.K.), 0.10 part by weight of 3,9-bis[2-{3-(3-tert-butyl-4-hydroxy-5-methylphenyl)propionyloxy}-1,1,-dimethylethyl]2,4,8,10-tetraoxaspiro[5.5]undecane (trade name: Sumilizer GAS80, supplied by Sumitomo Chemical Co., Ltd.) as a stabilizer, 0.10 part by weight of penta(erythrityl-tetra-β-mercaptolauryl)propionate (trade name: Seenox 412S, supplied by Shipro Kasei Kaisha) and 0.03 part by weight of calcium stearate (trade name: Calcium Stearate, supplied by Sankyo Yuki Gosei K.K.) were mixed at a high rate with a Henschel mixer for 1 minute. The resultant mixture was allowed to react by melt-kneading it with a twin-screw extruder at 310° C., and pellets were obtained. The pellets were measured for an MFR. The pellets were injection-molded to prepare specimens, and the specimens were measured for physical properties. Table 1 shows the results.

TABLE 1

| Evaluation item | Example 1 | Example 2 | Example 3 |
| --- | --- | --- | --- |
| Pellet MFR | 4.1 | 7.5 | 5.0 |
| Breaking stress (kg/cm$^2$, 23° C.) | 260 | 260 | 250 |
| Breaking strength (kg/cm$^2$, 23° C.) | — | — | — |
| Initial elastic modulus (kg/cm$^2$, 23° C.) | 13,000 | 12,000 | 12,000 |
| Breaking extension (%, 23° C.) | 64 | 60 | 62 |
| Breaking stress (kg/cm$^2$, 100° C.) | 68 | 60 | 58 |
| Breaking strength (kg/cm$^2$, 100° C.) | 86 | 90 | 95 |
| Initial elastic modulus (kg/cm$^2$, 100° C.) | 2,200 | 2,100 | 2,000 |
| Breaking extension (%, 100° C.) | 430 | >600 | >600 |
| Izod impact strength (kg cm/cm) | 5.0 | 4.7 | 4.3 |
| Flexural strength | 420 | 410 | 410 |

TABLE 1-continued

| Evaluation item | Example 1 | Example 2 | Example 3 |
| --- | --- | --- | --- |
| (kg/cm$^2$, 23° C.) | | | |
| Flexural modulus (kg/cm$^2$, 23° C.) | 13,000 | 12,000 | 12,000 |
| HDT (66 psi) | 108 | 106 | 107 |

Comparative Example 1

100 Parts by weight of a 4-methyl-1-pentene.1-hexadecene copolymer powder (1-hexadecene content: 4.0% by weight, MFR=0.5 g/10 minutes), 0.10 part by weight of 3,9-bis[2-{3-(3-tert-butyl-4-hydroxy-5-methylphenyl)propionyloxy}-1,1-dimethylethyl]2,4,8,10- tetraoxaspiro[5.5]undecane (trade name: Sumilizer GA80, supplied by Sumitomo Chemical Co., Ltd.) as a stabilizer, 0.10 part by weight of penta(erythrityl-tetra-β-mercaptolauryl)propionate (trade name: Seenox 412S, supplied by Shipro Kasei Kaisha) and 0.03 part by weight of calcium stearate (trade name: Calcium Stearate, supplied by Sankyo Yuki Gosei K.K.) were mixed at a high rate with a Henschel mixer for 1 minute. The resultant mixture was allowed to react by melt-kneading it with a twin-screw extruder at 310° C., and pellets were obtained. The pellets were measured for an MFR. The pellets were injection-molded to prepare specimens, and the specimens were measured for physical properties. Table 2 shows the results. Comparative Example 2

100 Parts by weight of polyethylene (MFR=1.5 g/10 minutes), 0.10 part by weight of 3,9-bis[2-{3-(3-tert-butyl-4-hydroxy-5-methylphenyl)propionyloxy}-1,1-dimethylethyl]2,4,8,10-tetraoxaspiro[5.5]undecane (trade name: Sumilizer GA80, supplied by Sumitomo Chemical Co., Ltd.) as a stabilizer, 0.10 part by weight of penta(erythrityl-tetra-β-mercaptolauryl)propionate (trade name: Seenox 412S, supplied by Shipro Kasei Kaisha) and 0.03 part by weight of calcium stearate (trade name: Calcium Stearate, supplied by Sankyo Yuki Gosei K.K.) were mixed at a high rate with a Henschel mixer for 1 minute. The resultant mixture was allowed to react by melt-kneading it with a twin-screw extruder at 210° C., and pellets were obtained. The pellets were measured for an MFR. The pellets were Injection-molded to prepare specimens, and the specimens were measured for physical properties. Table 2 shows the results.

Comparative Example 3

100 Parts by weight of polyethylene (MFR=1.5 g/10 minutes), 1.0 part by weight of zinc methacrylate, 0.10 part by weight of 3,9-bis[2-{3-(3-tert-butyl-4-hydroxy-5-methylphenyl)propionyloxy}-1,1-dimethylethyl]2,4,8,10-tetraoxaspiro[5.5]undecane (trade name: Sumilizer GA80, supplied by Sumitomo Chemical Co., Ltd.) as a stabilizer, 0.10 part by weight of penta(erythrityl-tetra-β-mercaptolauryl)propionate (trade name: Seenox 412S, supplied by Shipro Kasei Kaisha) and 0.03 part by weight of calcium stearate (trade name: Calcium Stearate, supplied by Sankyo Yuki Gosei K.K.) were mixed at a high rate with a Henschel mixer for 1 minute. The resultant mixture was allowed to react by melt-kneading it with a twin-screw extruder at 210° C., and pellets were obtained. The pellets were measured for an MFR. The pellets were injection-molded to prepare specimens, and the specimens were measured for physical properties. Table 2 shows the results.

TABLE 2

| Evaluation item | Comp. Example 1 | Comp. Example 2 | Comp. Example 3 |
| --- | --- | --- | --- |
| Pellet MFR | 38 | 5.0 | 4.9 |
| Breaking stress (kg/cm$^2$, 23° C.) | 220 | 300 | 300 |
| Breaking strength (kg/cm$^2$, 23° C.) | — | — | — |
| Initial elastic modulus (kg/cm$^2$, 23° C.) | 10,000 | 14,000 | 14,000 |
| Breaking extension (%, 23° C.) | 51 | 500 | 550 |
| Breaking stress (kg/cm$^2$, 100° C.) | 58 | — | — |
| Breaking strength (kg/cm$^2$, 100° C.) | 50 | — | — |
| Initial elastic modulus (kg/cm$^2$, 100° C.) | 1,700 | — | — |
| Breaking extension (%, 100° C.) | >600 | — | — |
| Izod impact strength (kg cm/cm) | 1.8 | 7.7 | 7.6 |
| Flexural strength (kg/cm$^2$, 23° C.) | 360 | 360 | 360 |
| Flexural modulus (kg/cm$^2$, 23° C.) | 10,000 | 15,000 | 14,000 |
| HDT (66 psi) | 105 | 87 | 90 |

EXAMPLE 4

100 Parts by weight of a 4-methyl-1-pentene.1-octadecene copolymer powder (1octadecene content: 6.0% by weight, MFR=0.5 g/10 minutes), 0.25 part by weight of magnesium methacrylate (supplied by Asada Kagaku K.K.), 0.10 part by weight of 3,9-bis[2-{3-(3-tert-butyl-4-hydroxy-5methylphenyl)propionyloxy}-1,1,-dimethylethyl]2,4,8,10-tetraoxaspiro[5.5]undecane (trade name: Sumilizer GA80, supplied by Sumitomo Chemical Co., Ltd.) as a stabilizer, 0.10 part by weight of penta(erythrityl-tetra-β-mercaptolauryl)propionate (trade name: Seenox 412S, supplied by Shipro Kasei Kaisha) and 0.03 part by weight of calcium stearate (trade name: Calcium Stearate, supplied by Sankyo Yuki Gosei K.K.) were mixed at a high rate with a Henschel mixer for 1 minute. The resultant mixture was allowed to react by melt-kneading it with a twin-screw extruder at 280° C., and pellets were obtained. The pellets were measured for an MFR. The pellets were molded into a raw sheet having a thickness of 370 μm, and a biaxially stretched film was obtained from the raw sheet. The biaxially stretched film was evaluated for physical properties. Table 3 shows the results.

Comparative Example 4

A biaxially stretched film was obtained in the same manner as in Example 4 except that no magnesium methacrylate was incorporated. Table 3 shows the results.

TABLE 3

| Evaluation item | Example 4 | Comparative Example 4 |
| --- | --- | --- |
| Pellet MFR | 7.7 | 58 |
| Biaxial stretchability | A | X |
| Film thickness (μ) | 15 | — |
| Breaking stress (kg/cm$^2$, 23° C.) | 230 | — |
| Breaking strength (kg/cm$^2$, 23° C.) | 370 | — |
| Initial elastic modulus | 8,500 | — |

TABLE 3-continued

| Evaluation item | Example 4 | Comparative Example 4 |
|---|---|---|
| (kg/cm², 23° C.) | | |
| Breaking extension (% 23° C.) | 14 | — |

Biaxial stretchability:
A: Stretchable at 5 times × 5 times without breakage to form a stretched form.
X: Unstretchable, and no stretched film was formed at 5 times × 5 times.

What is claimed is:

1. A modified α-olefin polymer whose side chain has tertiary carbon, obtained by melt-reacting 100 parts by weight of (A) an α-olefin polymer whose side chain has tertiary carbon with (B) 0.05 to 10 parts by weight of metal methacrylate or metal acrylate of the formula (1),

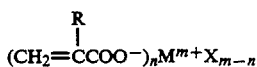  (1)

wherein R is a hydrogen atom or a methyl group, M is a metal cation, X is an anion, m is an integer of at least 2, and n is an integer of at least 2, with a proviso of $m \geq n$.

2. The polymer of claim 1, wherein the α-olefin polymer whose side chain has tertiary carbon is a 4-methyl-1-pentene-pentene polymer.

3. The polymer of claim 2, wherein the 4-methyl-1-pentene polymer is a random copolymer of an α-olefin having 2 to 20 carbon atoms and 4-methyl-1-pentene, and the random copolymer contains at least 80% by weight of a 4-methyl-1-pentene component.

4. The polymer of claim 2, wherein the 4-methyl-1-pentene polymer is a random copolymer of 4-methyl-1-pentene and an α-olefin selected from 1decene, 1-dodecene, 1-tetradecene, 1-hexadecene, 1-octadecene and a mixture of at least two of these α-olefins.

5. The polymer of claim 1, wherein the metal cation is $Ca^{2+}$, $Zn^{2+}$, $Mg^{2+}$, $Ba^{2+}$, $Al^{3+}$ or $Sn^{4+}$.

6. A stretched film formed of the modified α-olefin polymer whose side chain has tertiary carbon, as recited in claim 1.

7. The stretched film of claim 6, wherein the stretched film is a biaxially stretched film.

8. A modified α-olefin polymer whose side chain has tertiary carbon, obtained by melt-reacting 100 parts by weight of (A) an α-olefin polymer whose side chain has tertiary carbon with (B) 0.05 to 10 parts by weight of metal methacrylate or metal acrylate of the formula (1),

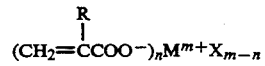  (1)

wherein R is a hydrogen atom or a methyl group, M is a metal cation, X is an anion, m is an integer of at least 2, and n is an integer of at least 2, with a proviso of $m \geq n$, wherein the α-olefin polymer whose side chain has tertiary carbon is a 4-methyl-1-pentene polymer, and wherein the 4-methyl-1-pentene polymer is a random copolymer of an α-olefin having 2 to 20 carbon atoms and 4-methyl-1-pentene, and the random copolymer contains at least 80% by weight of a 4-methyl-1-pentene polymer component.

9. The polymer of claim 8, wherein the metal cation is $Ca^{2+}$, $Zn^{2+}$, $Mg^{2+}$, $Ba^{2+}$, $Al^{3+}$ or $Sn^{4+}$.

10. The polymer of claim 9, wherein the 4-methyl-1-pentene polymer is a random copolymer of 4-methyl-1-pentene and an α-olefin selected from 1-decene, 1-dodecene, 1-tetradecene, 1hexadecene, 1-octadecene and a mixture of at least two of these α-olefins.

11. A film formed of the modified α-olefin polymer whose side chain has tertiary carbon, as recited in claim 10.

12. A modified α-olefin polymer whose side chain has tertiary carbon, obtained by melt-reacting 100 parts by weight of (A) an α-olefin polymer whose side chain has tertiary carbon with (B) 0.05 to 10 parts by weight of metal methacrylate or metal acrylate of the formula (1),

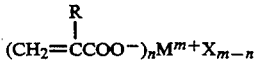  (1)

wherein R is a hydrogen atom or a methyl group, M is a metal cation, X is an anion, m is an integer of at least 2, and n is an integer of at least 2, with a proviso of $m \geq n$, wherein the α-olefin polymer whose side chain has tertiary carbon is a member selected from the group consisting of 4-methyl-1-pentene-pentene polymer, 3-methyl-1-butene polymer, 4-methyl-1-hexene polymer, 5-methyl-1-hexene polymer and 5-methyl-1-heptene polymer, and wherein the said polymer is a random copolymer of an α-olefin having 2 to 20 carbon atoms and the random copolymer contains at least 80% by weight of the side chain having the tertiary carbon.

13. The polymer of claim 12, wherein the metal cation is $Ca^{2+}$, $Zn^{2+}$, $Mg^{2+}$, $Ba^{2+}$, $Al^{3+}$ or $Sn^{4+}$.

14. The polymer of claim 13, wherein the said polymer is a random copolymer of an α-olefin selected from the group consisting of 1-decene, 1-dodecene, 1-tetradecene, 1-hexadecene, 1-octadecene and mixtures thereof.

15. A film formed of the modified α-olefin polymer whose side chain has tertiary carbon, as recited in claim 14.

* * * * *